United States Patent
Butland et al.

(10) Patent No.: US 6,301,527 B1
(45) Date of Patent: Oct. 9, 2001

(54) UTILITIES COMMUNICATIONS ARCHITECTURE COMPLIANT POWER MANAGEMENT CONTROL SYSTEM

(75) Inventors: Geoff Butland, Farmington; Patrick Meagher, Cromwell; Radoslaw Narel, New Britain; James Petrizzi, Tariffville, all of CT (US); Drew Baigent, Toronto (CA)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/405,346

(22) Filed: Sep. 24, 1999

Related U.S. Application Data (63) Continuation-in-part of application No. 08/628,533, filed on Apr. 3, 1996, now abandoned.

(51) Int. Cl.$^7$ .................. G05D 11/00; G06F 1/26
(52) U.S. Cl. .................. 700/286; 700/295; 713/300
(58) Field of Search .................. 700/286, 295; 713/300

(56) References Cited

U.S. PATENT DOCUMENTS 5,768,148 * 6/1998 Murphy et al. .................. 700/286
5,862,391 * 1/1999 Salas et al. .................. 713/300

* cited by examiner

*Primary Examiner*—William Grant
*Assistant Examiner*—Ronald D Hartman, Jr.
(74) *Attorney, Agent, or Firm*—Cantor Colburn LLP; Carl B. Horton (57) ABSTRACT

Software (50) is loaded into the host computer (12) and includes an Ethernet server (52), a Modbus (DDE) server (54), an MMS server (56), and a third-party proprietary protocol server (58). Each of these servers (52, 54, 56, and 58) allows external programs (60) running on the host and view node computers (12, 40, and 44) to access power management data from the various devices (26) in the power management control system (10). Modbus server (52) allows external programs (60) to access power management data from devices (26), which communicate using the Modbus protocol. MMS server (56) allows external programs (60) to access power management data from MMS/UCA2 compliant devices (34), which communicate using the MMS protocol. Ethernet server (52) provides for network layer TCP/IP encapsulation for communications over Ethernet networks (20) and (22). Third party server (58) allows communications between external programs (60) and device (38), which uses any proprietary protocol. Power management control system (10) implements the UCA Version 2 architecture, having an Ethernet physical layer, a Transport Control Protocol/Internet Protocol (TCP/IP) network layer, and a Manufacturing Message Specification (MMS) application layer.

11 Claims, 9 Drawing Sheets

Register Mapping Scheme

AMP_A => Current of phase A for a meter identified by DDE topic,
Register address R30020

VOL_A => Voltage of phase A for a meter identified by DDE topic,
Register address R30100

R30400 => An item addressed directly with register address.
No conversion required.

UTILITIES COMMUNICATIONS ARCHITECTURE COMPLIANT POWER MANAGEMENT CONTROL SYSTEM

This is a continuation-in-part of U.S. Patent Application No. 08/628,533, filed Apr. 3, 1996,now abandoned, which is incorporated by reference herein.

BACKGROUND OF THE INVENTION

The invention relates generally to a power management control system and in particular, to a power management control system that implements the Utility Communications Architecture (UCA).

In today's power management control systems, a variety of power monitoring or control devices are connected to a common bus which allows the power monitoring or control devices to communicate with a server. One standard protocol used for communicating between the server and the power control and monitoring devices is the Modbus RTU standard. There are many Modbus RTU/DDE Servers commercially available for a wide variety of applications. All major electrical distribution companies have a similar product. The narrow scope of these servers are their major limitation. These systems expect the client applications (Man-Machine Interfaces) to handle the complexities of the actual power controlling and metering devices. Many of the servers are designed to communicate using a protocol designed for use with only certain devices, family of devices or specially designed devices. Also, not all the servers are able to support any generic Modbus RTU compliant device.

An improvement over such power management control systems is described in U.S. Pat. No. 5,862,391 entitled "power Management Control System." The power management control system described therein comprises a computer having standard RS485 interface cards and adapters installed in its I/O slots defining multiple industry standard Modbus RTU networks. Devices with a Modbus RTU interface can be connected directly to the Modbus and other devices which communicate on the Commnet protocol require a Modbus concentrator. The Modbus concentrator provides an interface between the Modbus RTU protocol and the Commnet protocol, whereby these other devices can communicate through the Modbus concentrator over the Modbus. Alternatively, standard Ethernet interface cards and adapters are installed in the computer's I/O slots defining multiple standard Ethernet TCP/IP networks. The Ethernet TCP/IP protocol is a well known standard, which would allow a user of the power management control system of the present invention to use its existing LAN. Ethernet gateways are connected to the Ethernet TCP/IP networks to provide an interface between the Ethernet TCP/IP protocol and the Modbus RTU protocol.

The Utility Communications Architecture (UCA), developed by the Electrical Power Research Institute (EPRI), provides a flexible and scaleable computer communications architecture for communication within and among control systems in the electric, gas, and water utilities. The UCA, currently under Version 2, is a suite of existing technologies and standards, which includes an Ethernet physical layer, a Transport Control Internet/Internet Protocol (TCP/IP) or International Organization for Standards Open Systems Interconnect (ISO-OSI) network layer, and a Manufacturing Message Specification (MMS) application layer. MMS is an internationally standardized messaging system for exchanging real-time data and supervisory control information between networked devices and/or computer applications in a manner that is independent of the application that is being performed or the developer of the device or application. UCA Version 2 provides many beneifits to a control system, including interoperability between different vendors over the same communication network, and rapid installation due to self-defining, object oriented data objects.

BRIEF SUMMARY OF THE INVENTION

In an exemplary embodiment of the invention, a power management system includes a computer with an interface defining a first network having a network layer protocol. A gateway is connected to the first network for converting the network layer protocol to a first application layer protocol and defining a second network. A first intelligent electronic device is connected to the second network, and a second intelligent electronic device is connected to the first network. A first server associated with the computer communicates with the first intelligent electronic device using the first application layer protocol. A second server associated with the computer communicates with the second intelligent electronic device using a second application layer protocol. The first and second servers processing data received from the first and second intelligent electronic devices to manage power use.

BRIEF DESCRIPTION OF THE DRAWINGS

Referring now to the drawings wherein like elements are numbered alike in the several FIGURES.

DETAILED DESCRIPTION OF THE INVENTION

Figure 1:
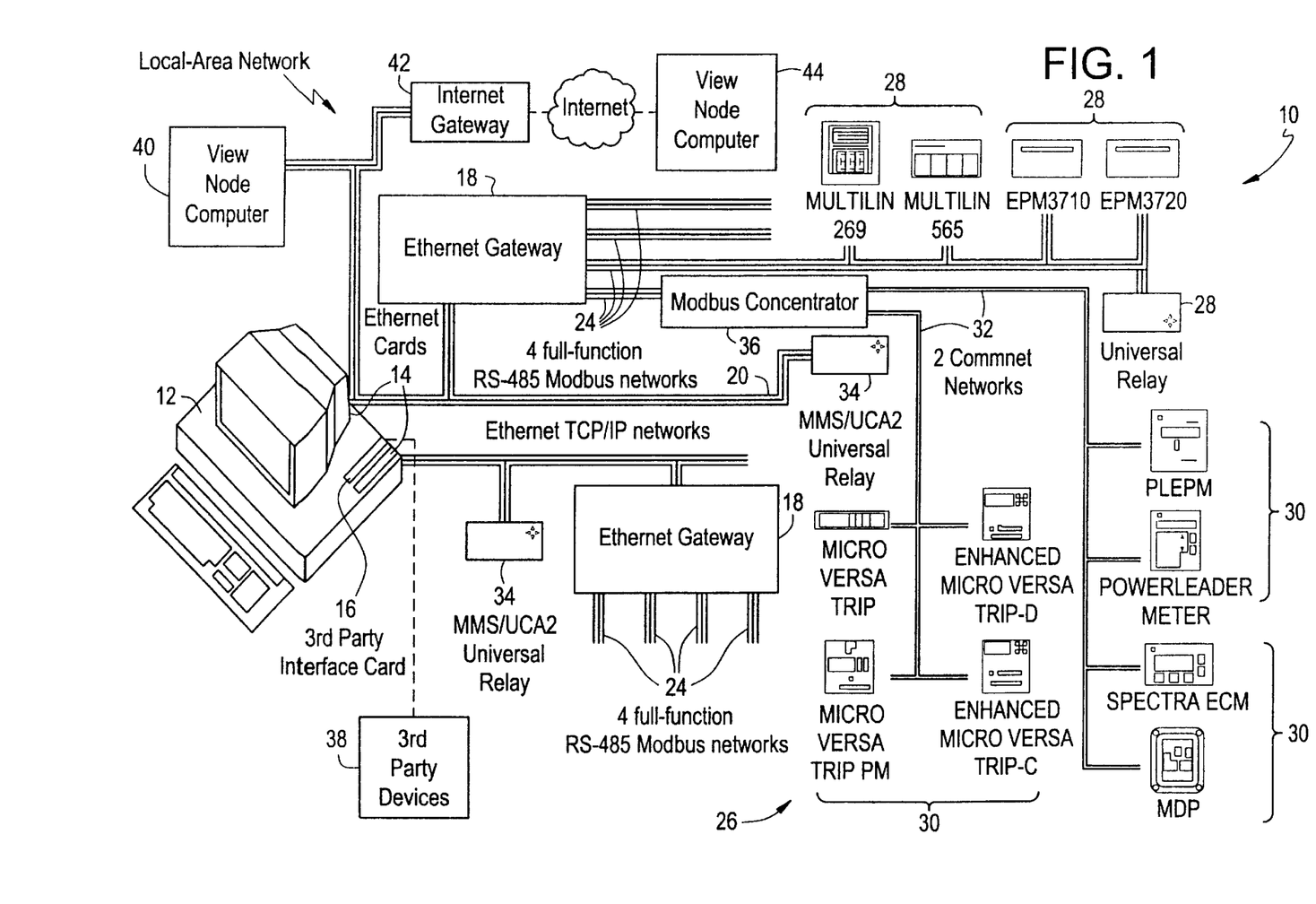
FIG. 1 is a block diagram of a UCA compliant power management control system, in accordance with the present invention.

Referring to FIG. 1, a network diagram for a power management control system (PMCS), generally shown at 10, is in accordance with aforementioned U.S. patent application Ser. No. 08/628,533, which is incorporated by reference. System 10 allows the monitoring and control of a plurality of intelligent electronic devices 26 of an electrical distribution system (not shown). System 10 comprises a host computer 12, e.g., a PC based computer, having standard Ethernet interface cards 14 and a third-party interface card 16 installed in its I/O slots. The computer 12 contains software for monitoring and controlling selected aspects of power usage/consumption, as described in more detail hereinafter. Ethernet gateways 18 are connected to Ethernet TCP/IP networks 20 and 22 to provide an interface between the Ethernet TCP/IP protocol and the Modbus RTU protocol. In the present example, each Ethernet gateway 18 provides a connection between an Ethernet TCP/IP network 20 and 22 and four Modbus RTU networks 24. Ethernet gateway 18 is commercially available, e.g. General Electric Co.'s Power Leader Ethernet Gateway. The Ethernet TCP/IP protocol is a well-known standard (IEEE standard 802.3), which would allow a user of the power management control system of the present invention to use an existing LAN. The use of an existing LAN may significantly reduce installation cost of the system, since much of the system wiring may already be in place. The Modbus RTU protocol is a well-known industry standard see, e.g., "Modicon Modbus Protocol-Reference Guide" Rev. E., Modicon, Inc.

Intelligent electronic devices 26 include a first group of intelligent electronic devices 28 that can be connected directly to Modbus networks 24, a second group of intelligent electronic devices 30 that can be cormected to Commnet networks 32, and a third group of devices 34 that can be connected directly to Ethernet networks 20, 22. Each device in first group 28 has a Modbus RTU interface, which can be connected directly to Modbus networks 24. Devices in the first group 28 include control devices, such as Multilin models 269 and 565, power management EPM 3710 and EPM 3720, and General Electric Co.'s Universal Relay family of modular relay devices. The second group of intelligent electronic devices 30 communicates using the Commnet protocol, and includes trip units, e.g., Micro Versa Trip, Enhanced MicroVersa Trip-D and Enhanced Micro-Versa Trip-C Units, which are commercially available from General Electric Co., meters, e.g., Power Leader Meters commercially available from General Electric Co., and relays, e.g., General Electric Co.'s Spectra ECM and Power Leader MDP. A Modbus concentrator 36 provides an interface between the Modbus RTU protocol and the Commnet protocol, whereby devices 30 can communicate through Modbus concentrator 36 to Modbus networks 24. The third group of intelligent electronic devices 34 have an Ethernet interface and are connected directly to Ethernet networks 20, 22. The third group of devices 34 includes, for example, General Electric Co.'s Universal Relay family of modular relay devices. Devices 34 are arranged to communicate using the MMS protocol. Third-party devices 38 (devices manufactured by a third-party that use a proprietary protocol) can be connected directly to the host computer 12, or can be connected to the Ethernet, Modbus, or Commnet networks 20, 22, 24, or 30 via a gateway or concentrator designed for the proprietary protocol.

Ethernet TCP/IP networks 20 and 22 also include view node computer 40 and Internet gateway 42. In the present example, view node computer 40 interacts with host computer 12 through OPC/DCOM or NetDDE links established via Ethernet TCP/IP network 20. Similarly, a remote view node computer 44 interacts with host computer 12 through OPC/DCOM or NetDDE links established via the Internet, Internet gateway 42, and Ethernet TCP/IP network 20.

Figure 2:
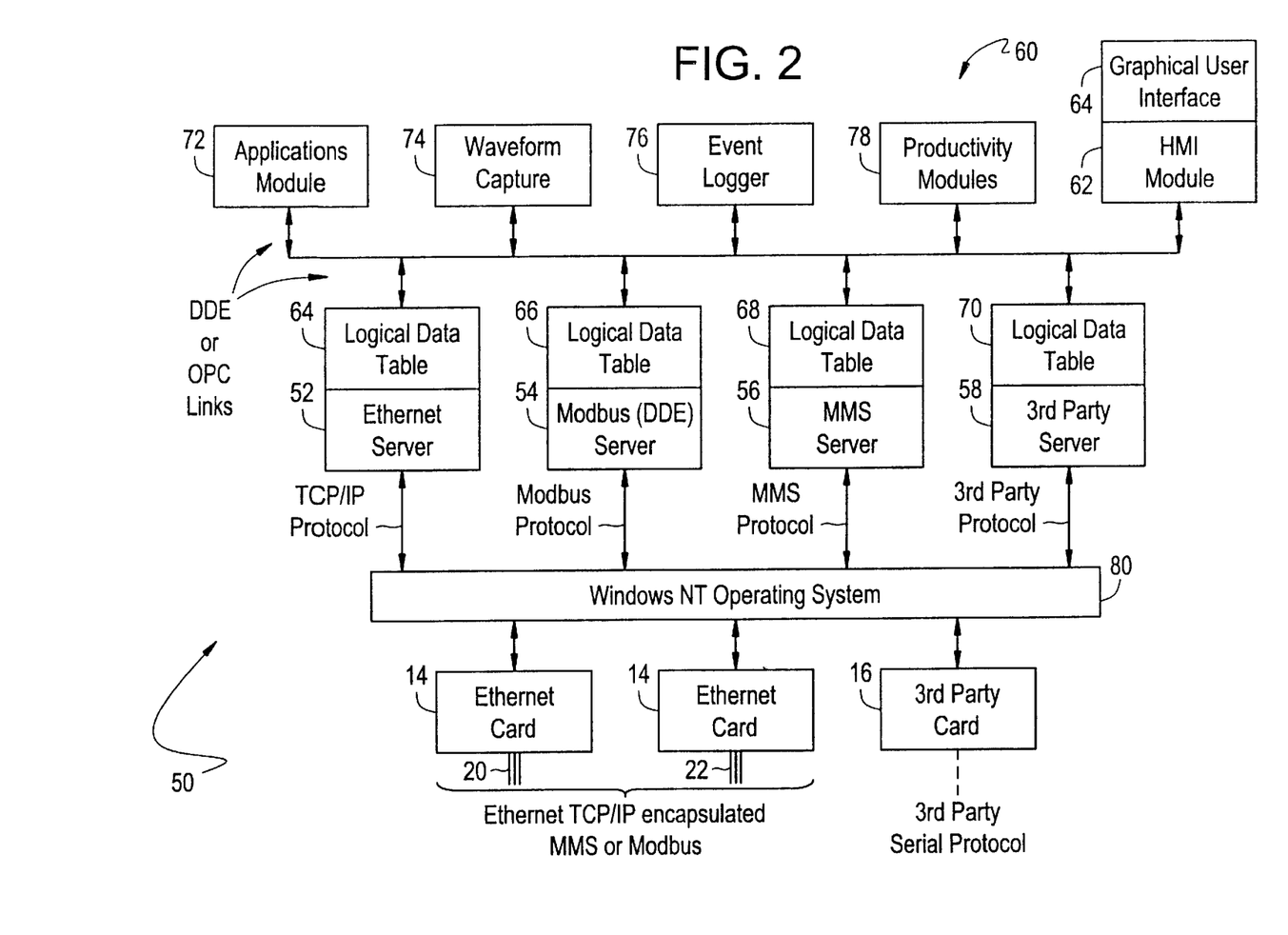
FIG. 2 is a block diagram of the computer software used in the power management and control system of FIG. 1.

Referring now to FIG. 2, a block diagram of the software for monitoring and controlling selected aspects of power usage/consumption, discussed above is generally shown at 50. Software 50 is loaded into the host computer 12 as described above and includes an Ethernet server 52, a Modbus (DDE) server 54, an MMS server 56, and a third-party proprietary protocol server 58. Each of these servers 52, 54, 56, and 58 allows external programs (clients) 60 running on the host and view node computers to access power management data from the various devices 26 in the power management control system 10. Data interface to each of these servers is provided by the system through a Human-Machine Interface (HI) utility 62. Modbus server 52 is a 16 bit application under Windows NT, which is described herein below. Modbus server 52 allows external programs 60 to access power management data from devices 26, which communicate using the Modbus protocol. MMS server 56 is commercially available, for example, as Systems Integration Specialists Company Inc.'s AX-S4MMS MMS server. MMS server 56 allows external programs 60 to access power management data from MMS/UCA2 compliant devices 34, which communicate using the MMS protocol. Ethernet server is also commercially available, for example, as General Electric Co.'s DDE server—Ethernet Version. Ethernet server 52 provides for network layer TCP/IP encapsulation for communications over Ethernet networks 20 and 22. Third party server 58 allows communications between external programs 60 and device 38, which uses a proprietary protocol.

Associated with servers 52, 54, 56, and 58 are logical data tables 64, 66, 68, and 70, and related modules, i.e., an Excel or other DDE aware applications module 72, a waveform capture module 74, an event logger module 76, productivity modules 78, and HMI module 62. Module 62 includes a tool kit for building screens and interfaces, and a graphical user interface 64 for monitoring and control of the electrical distribution system 10. The graphical user interface 64 operates in a 32 bit Windows or Windows NT environment using HMI library functions. Module 74 provides for viewing and analysis of waveforms (e.g., Fourier, frequency and/or harmonic analysis) captured by sophisticated metering devices. Module 76 provides for viewing, organizing and analyzing unusual behavior in a power system. Productivity modules 78 include, for example, a cost allocation module and a load management module. The cost allocation module provides for tracking power consumption to the sub-unit level, developing internal billing methods and reports, thereby reducing cost. The load management module provides for tracling power demand and automatically shedding non-critical loads to prevent peak demand penalties, and provides for timer-based control to reduce power consumption.

Host computer 12 receives Ethernet TCP/IP packets via Ethernet networks 20 and 22 and Ethernet cards 14. Ethernet server 52 strips the packets of their network layer TCP/IP protocol data and provides the data to a Windows NT operating system 80. The Windows NT operating system 80 routes the data to the appropriate server 54, 56, or 58, based on the application layer protocol. The appropriate server receives the data, removes the application layer data, and establishes an OPC or DDE link to deliver the data to the module 72, 74, 76, or 78 to which the data was addressed. Delivery of a message to an intelligent electronic device 26 involves the same steps in reverse, with servers 52, 54, 56, and 58 adding application and network layer protocol data to properly format and address the data to the intelligent electronic device 26.

Serial data (no TCP/IP packaging) is sent to third-party card 16 using any proprietary protocol. Windows NT operating system routes this data directly to third party server 58, which creates an OPC or DDE link to deliver the data to the module 72, 74, 76, or 78 that initiated the data request. Delivery of a message to third party server involves the same step in reverse, with the third party server providing the application layer protocol data to properly format the data to the third party device 38.

Power management control system 10 implements the UCA Version 2 architecture, having an Ethernet physical layer, a Transport Control Protocol/Internet Protocol (TCP/IP) network layer, and a Manufacturing Message Specification (MMS) application layer. As can be seen, power management control system 10 provides configuration flexibility by allowing Commnet protocol devices, Modbus protocol devices, MMS protocol devices, and third party proprietary devices to be included in the same control network.

Referring again to FIG. 1, commercially available Ethernet gateway 18 encapsulates a serial protocol in a LAN packet (TCP/IP). The Ethernet network 20 or 22 sends and receives data packets to and from Ethernet gateway 18. Packets of serial data, encapsulated in a TCP/IP packet, received from computer 12, are retransmitted by gateway 18 to remote data monitoring devices 28 and 30 on the appropriate serial port, and conversely, data packets received by gateway 18 on a serial port will be sent to computer 12 via the Ethernet network 20 or 22. Since, gateway 18 seeks to retransmit packets received from the LAN, it is very important to ensure that these packets did in fact come from the power management system and not other non-related devices such as view node computers 40 and 44 (i.e., authentication and security).

Modbus concentrator 36 is generally a multiple channel data converter/multiplexer, as described in aforementioned U.S. patent application Ser. No. 08/628,533. Concentrator 36 translates data between two protocols for multiple metering and protective devices (i.e., between General Electric Co.s' Commnet peer to peer network protocol and the industry standard Modbus RTU protocol). The concentrator 36 acts as a pseudo host for Commnet devices 30 and as pseudo slave for each device in the Modbus RTU network 24. Concentrator 36 creates virtual Modbus devices for every physical Commnet device 30 attached to its multiple channels (networks) 32. Multiple channels 32 allow parallel processing for data conversion, improving the throughput of the network in which it is utilized. Further, concentrator 36 autoconfigures itself by seeking all the devices attached in the Commnet channels 32 and storing this information in a configuration database, which is used to determine address conflicts among the attached Commnet devices 30. The concentrator 36 in the present example provides eight Commnet channels and allows connection of four Commnet devices 30 per channel. The RS485 standard physical interface is preferably opto-isolated.

Modbus concentrator 36 communicates with host computer 12 through a command-response protocol in which the Modbus concentrator 36 (slave) responds to the computer 12 (master) requests. In this architecture, the computer 12 initiates transactions using Modbus RS-485 request frames and the Modbus concentrator 36 responds by supplying the requested data to the computer in the appropriate response message, or by taking appropriate action requested by the computer 12. Each Modbus concentrator 16 has a unique device address on the Ethernet network 24.

The Modbus RTU protocol defines the format of the frame for all requests by placing into it the receivers address (slave) a function code defining the requested action, any data to be sent and an error checking field. The Modbus concentrator 36 response message is also constructed using the Modbus RTU protocol. The Modbus concentrator 36 response frame contains its address, confirming the action taken, any data to be returned and an error checking field. The Modbus concentrator 36 sends an exception message in response if an error occurred in receipt of a message, or if the Modbus concentrator is unable to perform the requested action. The basic format of a Modbus request and response frames are illustrated in the following TABLE.

TABLE

| Request Frame | | Response Frame |
|---|---|---|
| Device Address | → | Device Address |
| Function Code | | Function Code |
| Data Bytes | ← | Data Bytes |
| Error Check | | Error Check |

The device address field of the Modbus frame consists of one byte (i.e., 8 bits). In the present example, valid Modbus concentrator 36 addresses are in the range of 1–247 (decimal). The computer addresses a virtual device 30 by placing its address in the address field of the frame. When the virtual device 30 sends its response, it places its own address in this address field to let the computer know which virtual device 30 is responding, if more than one are present. Address '0'is used for a broadcast address. No response from the slave devices is expected for a broadcast message. The host computer downloads time to the virtual devices 30 connected to the concentrator 36. On receipt of this message, the Modbus concentrator's 36 main processor and segment processors update the time in their respective set point registers.

The function code field of a message is one byte. The Modbus concentrator 36 supports only a subset of Modbus RTU protocol function codes. The data field of the Modbus frame is constructed using sets of two hexadecimal digits, in the range of 00 to FF hexadecimal, and represents additional information. The data field of request frame contains information that the Modbus concentrator must use in performing the action defined by the function code. The response frame contains information the computer requested from the Modbus concentrator. The error checking field is two bytes wide and is based on a cyclical redundancy check (CRC) calculation performed on the message contents.

The Modbus concentrator 36 has the capability to interface with up to eight Commnet segments 32. Each segment processor of the Modbus concentrator 36 interfaces with up to a maximum of four Commnet devices 30. The segment processors are responsible for scheduling the transmission of Commnet request messages, receiving scheduled response messages and unsolicited messages from the Commnet devices. The Commnet protocol is described in Commnet Device Functional Handbook (GE ED&C 331A3105P1) and CommNet Application Language Handbook (GE ED&C 331A2673P1), which are incorporated herein by reference.

Modbus (DDE) server 54 is described herein for a RS485 interface (serial) embodiment. However, it will be appreciated that the same is applicable to the Ethernet interface embodiment described herein, with the exception that the server is optimized for Ethernet protocol (instead of Modbus RTU protocol). DDE server 54 provides a mnemonic cross-reference between Modbus RTU register items and standardized, alphanumeric parameter names. This mnemonic interface allows the user to retrieve data from a device without knowledge of the actual device register item number. DDE server 54 further provides a consistent device event data item for dissimilar devices. Also, DDE server 54 automatically performs time synchronizing for all supported devices and provides a consistent waveform interface. DDE server 54, for the RS485 interface, is optimized for Modbus RTU protocol by compensating for invalid ranges of registers in the device polling packets and it also provides superior protocol debugging capabilities by displaying the complete Modbus RTU input/output packet traffic. In addition, the DDE server 54 performs automatic conversion between 16 bit and 32 bit device register modes. A generic interface allows any Modbus RTU device to be used with the system. The DDE server uses the Modbus RTU protocol standard for communication to metering, relaying and I/O devices using the RS-485 communication ports.

Every windows application is registered in a windows kernel with an application name. To uniquely identify a data item for communication between two cooperating (process aware) windows applications, the data item is identified by tuple (Application, Topic, Item). Topic name provides a grouping and item name specifies the actual data point to be accessed under a topic. For the DDE server, the application name is the server's executable name. Topic name can be the device identification name and item name can be the register identification of a field data point. For example, with a General Electric Co. EPM meter, the tuple can be GE16MODB, EPM1, AMP.sub.- A where GE16MODB is the Application name for a DDE Server, EPM1 is the meter identification name, and AMP.sub.- A is the current for phase A. DDE messages mainly include requests to send data as identified by the Topic and Item name. They may also be for set point download to the data point as identified by the Topic and Item names. Input parameter values are reported by field devices on the communication interface in response to a poll by the server. This value may be a float value, an integer value, a string or discrete status bits.

The DDE server includes toolkit functions that are used to maintain DDE or NetDDE communications. Registers can be classified into Fast Poll Registers, Slow Poll Registers and Poll Once Registers. Fast Poll Registers are polled at a rate defined by 'Scan Interval', which is entered during device/topic configuration. Slow Poll Registers are polled once in every 'n' fetches of Fast Poll Registers and the value of 'n' is read from an initialization file. 'Poll Once' registers are polled only once when an item in that group becomes active. 'Poll Once' registers are also polled when a device status changes from DEAD to ACTIVE. Set points registers are to be downloaded based on request from a DDE client, i.e., a program, for example, such as an HMI package or MS-Excel, which request data items from the DDE server and accepts data through DDE or NetDDE.

Figure 3:
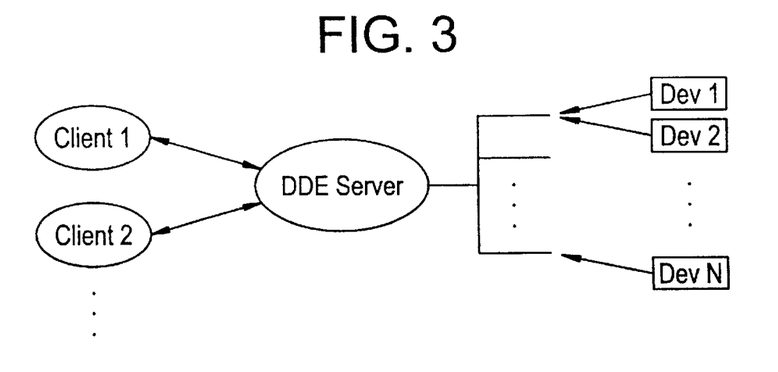
FIG. 3 is a schematic block diagram the DDE server link between clients and devices of the power management and control system of the present invention.

Referring to FIG. 3, the DDE server acts as a link between a client requesting device data and a field device that can provide the data. The DDE server communicates to the field device through communication ports and to the client via a DDE or NetDDE message link. A client sends its requests to the server to read/write some device registers. The server maps each request to suitable device read/write request packets and carries out the necessary transaction with the device. Then it relays the result back to the client after processing and, if necessary, casts the collected device data to the proper format. Apart from reporting contents of normal device registers, the server can also collect special data like waveform capture/recording data from the device and pass it to a client.

Figure 4:
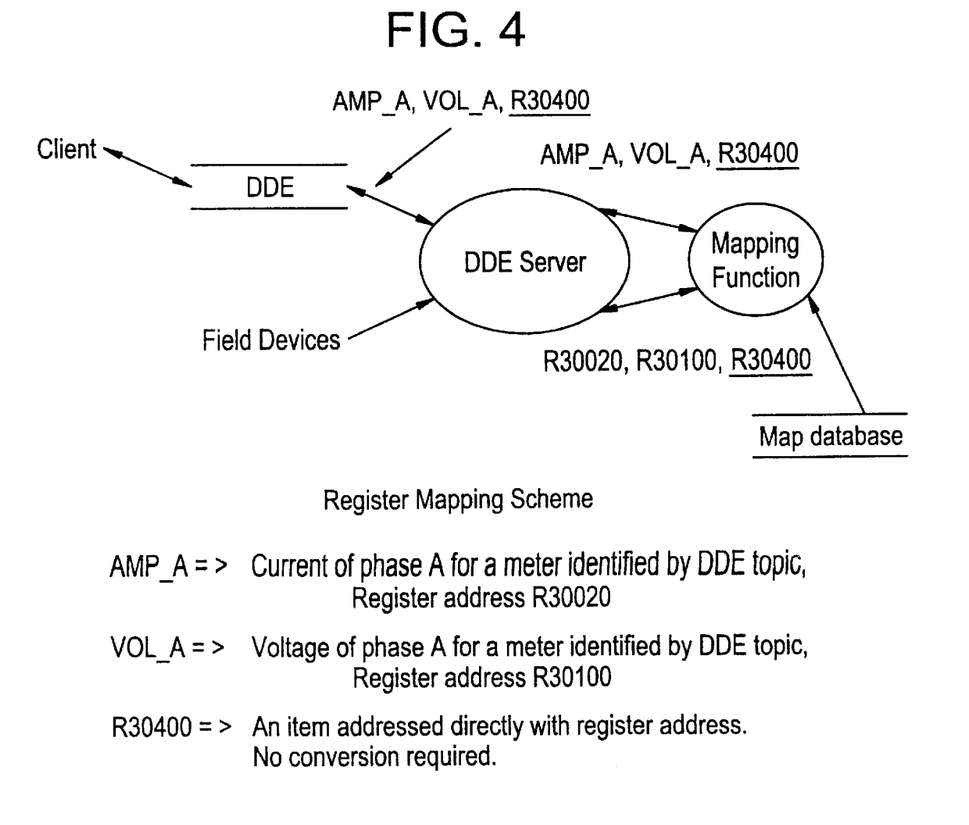
FIG. 4 is a schematic block diagram of the DDE server register mapping scheme of the power management and control system of the present invention.

To ease the configuration of field data points the user can access field data points on the DDE or NetDDE link using mnemonics which easily identify data points rather than using register addresses. At the same time, the register based item names are provided to maintain compatibility with Modbus RTU protocol conventions. Referring to FIG. 4, the DDE server maps item names to their register addresses. The name mapping database and functions are implemented in such a manner that underlying server does not get affected when new naming conventions for item are to be implemented. Preferably an off-line utility builds a device mnemonic to register address map. The device mnemonic to register map can then be imported during off-line mode, as described hereinafter. The DDE server supports the following data types; signed integer, unsigned integer, signed long, modulus 10000, floating points numbers in IEEE format, discrete bits, and an array of any of the above data types.

The DDE server interfaces through the RS485 interface, e.g., a multiport (4 port or 8 port) RS485 Stargate communication card or through a RS232/RS485 converter. The RTS line may have to be activated/deactivated to ensure proper flow control. Hardware flow control for all the ports is enabled/disabled when the communication port is configured. In the present example, the DDE server supports a maximum of 8 communication ports, whereby a maximum of 247 Modbus RTU devices can be connected on each port and the Modbus concentrators cannot have an address greater than 32. Addresses of devices connected to any one port should be unique. DDE server 54 can interface to client nodes on a network using NetDDE support for DDE communication.

The DDE server supports following data types: unsigned integer, a default for Rnnnrn item name; signed integer, specified is 'I' with an Item name of RnnnnnI; long signed integer, specified is 'L' with an Item name of RnnnnnL; floating point value, specified is 'F' with an Item name of RnnnnnF; discrete status bits, specified is 'D' with an Item name of RnnnnnDxxxxx; modulus 10000, specified as 'E' with an Item name of RnnnnnE; and array values, an array of either signed integer, unsigned integer, long signed integer and float values with array specified 'Axxx'.

Figure 5:
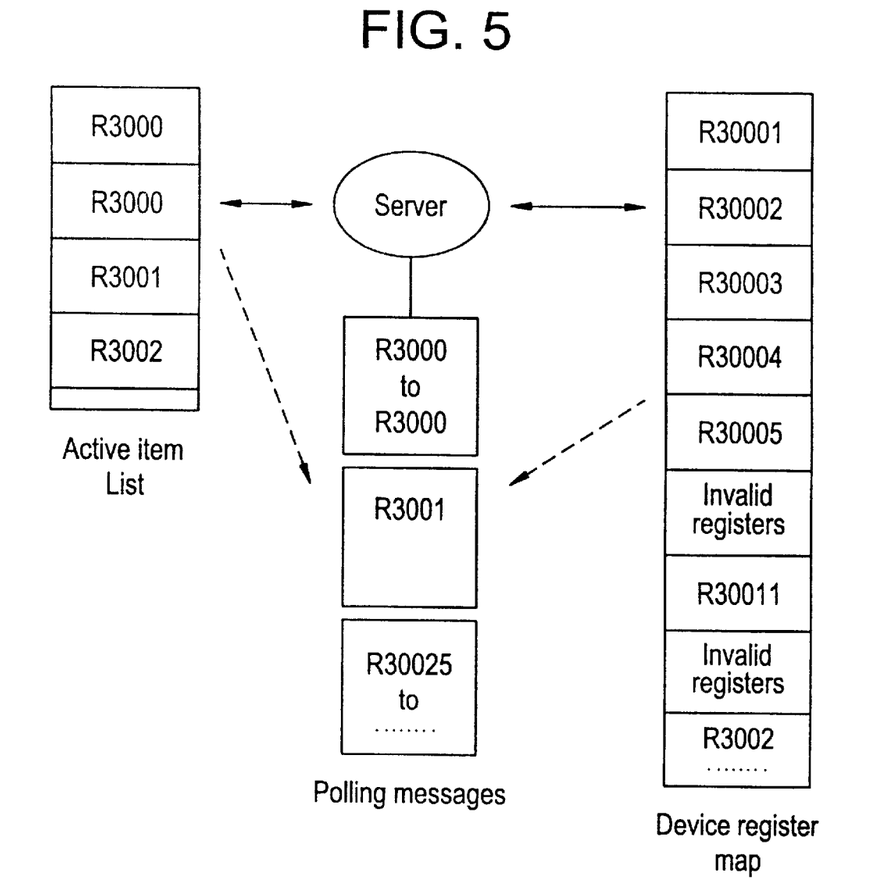
FIG. 5 is a schematic block diagram of the DDE server, register map and message polling of the power management and control system of the present invention.

Referring to FIG. 5, the DDE server handles field device communication through timer call back functions. The DDE server polls the devices which are in an active list and from each device it acquires registers (items) which are in the active list. The DDE server may group various items while performing data acquisition to optimize polling required from field devices. Device register maps usually have some gaps for future use. While grouping various items in a single polling cycle, the DDE server accounts for invalid register addresses for a particular device. Fast and Slow Group Registers are not packed into the same packet. The DDE server may have to limit grouping because of limitations on packet length of the response packet or the download packet. The maximum packet length is restricted to 125 registers (250 bytes) by Modbus RTU protocol standards. The DDE server executes set point commands received from client applications and communicates all set point values to the devices. The DDE server periodically synchronizes time with connected devices and adjusts for the time formats of each of these devices.

The Modbus concentrator accepts time register write requests for all devices connected to it but does not change the time register value of any device in response to write requests. The time registers for all the devices connected to a Modbus concentrator will be changed only when the server synchronizes time with the concentrator. Periodical time download to selected devices are performed even if it may not have any effect on that particular device. Time synchronization for other devices are performed as per the register format specified for the device register maps.

The DDE server maintains current status (DEAD/ACTIVE) of all active topics (devices). This information does not have any direct register associated with the device topic name and hence a pseudo item called 'STATUS' is maintained by the DDE server. If the DDE server does not get a response from any device during 'n' consecutive poll cycles then that particular device is declared DEAD. The value of 'n' is read from an initialization file. The status of any device will be updated to a client only if a predefined item called 'STATUS' is made active. DEAD devices would be polled with period equal to a dead device scan interval (available in initialization file) instead of the device scan interval. DEAD devices will become ACTIVE when they respond to a polling request.

The DDE server displays communication traffic in text format in its Window, if it is setup to do so. A setup option is provided in the server main menu for this purpose. Communication traffic is displayed in a 'scrollable' window for selected devices and selected options.

Further, the DDE server logs communication errors which include, by way of example, time-out errors, CRC errors, wrong station ID responses, exception responses and extra bytes reported in the response to a query from the device. The DDE server logs communication errors for ACTIVE devices only and logs the device status whenever a device becomes ACTIVE or DEAD.

Server configuration data is accepted through the interfaces and is stored in initialization files or other configuration files. Configuration is an off-line function and is disabled during run-time. The configuration utility is provided for: communication port configuration, device/topic configuration, device type register map configuration, device type register group polling priority configuration, device type supported function codes configuration, device type register map invalid register addresses, item mnemonic to register mapping, and server operational parameters. The configuration utility also allows the export and import of register groups and mnemonics.

In the present example, up to 8 communication ports can be configured. It will be appreciated, that this is restricted by the number of ports that the 16 bit Windows or Windows NT communication driver will support. For each port the following parameters can be configured:

Baud Rate: 1200, 2400, 4800, 9600, 14400, 19200, 38400, 57600

Parity: Even, Odd, None

Stop Bits: 1, 2

Hardware flow control: Enable, Disable

Presently, Modbus RTU protocol standards require eight bits. At the time of initialization, the DDE server configures the communication ports, devices and timers as defined by user. Also, all device specific databases are initialized. From the main menu the user can start the server, stop the server, suspend protocol, and resume protocol during runtime.

Configuration ranges in the present example are as follows; a device name can be up to 20 characters, a scan interval can be in the range of 1-9999999 milliseconds, and a slave address can be in the range of 1–247. It will be appreciated, that multiple topics can be configured with the same slave address and communication port. The configuration utility will detect multiple topics before configured on the same slave address and will issue a warning message to this effect when user configures a topic on an already configured address. The communication port to which a device is connected must be previously defined.

A device type register map must be configured for each of the device topics connected thereto. The system provides for configuration of a starting valid address, a last valid address, a set of invalid register blocks using this utility. Valid registers, in the present example, are R0XXXX; R1XXXX; R3XXXX; or R4XXXX. Accordingly, DDE server 54 supports the following Modbus register types; R0XXXX—Discrete coils, R1XXXX—Discrete status registers, R3XXXX—Input registers, and R4XXXX—Set point registers. With these generic types, a user can configure any number of register types. Each of these types will have poll rate attributes (i.e., Fast Poll, Slow Poll, or Poll Once). Buffered events, read/write date/time registers for time synchronization, waveform capture data and waveform recording data are implemented differently in the devices which support them hence, no common configuration utility is provided for these functions. The DDE server handles each of these functions specifically. Again a mnemonic name is associated with a register address. Further, a user can configure protocol timer tick and valid data time out value with this utility. Server time out tick is read from an initialization file.

By way of example, several of the devices discussed above, i.e., EPM, RMS6, RMS9B, RMS9C, RMS9D, ECM, MDP and the Modbus concentrator, include register types R3XXXX; R4XXXX; and R0XXXX. To acquire data from these devices and to download set points, the DDE server implements Modbus function codes, 01, 03, 04, 05, 06, 16, 56. Various register groups, i.e., dynamic values, set points, command registers, event registers, fixed value registers, and Commnet statistics can be configured by the user into either Slow Poll Register or Fast Poll Registers or Poll Once Registers. The DDE server downloads time stamps to all these devices periodically. Time download periodicity is available in an initialization file. An event count register is polled at the Fast Poll rate. When the event count register is non-zero, an event fetch is performed by reading the start address from the event buffer. Each event is read and time stamped sequentially. The event code is expanded with a description, additional data fields, and a date stamp of the events before sending to client.

In general, the DDE server provides appropriate return values as specified for all clients, i.e., periodic polling packets for active topics and items, periodic polling packets for events and status, periodic update of time to all the devices, data value update to clients for acquired items, event/status report to the HMI package so that it becomes part of normal alarm log, and status update for active topics (devices). Set point write requests are properly formatted set point download communication packets for the request. Execution and termination of the server are initiated on user request from the DDE server window menu.

The following Modbus function codes are supported by the DDE server of the present invention:

Function Code 1: Read Coils,

Function Code 2: Read Input status,

Function Code 3: Read holding registers,

Function Code 4: Read input registers,

Function Code 5: Write single coil,

Function Code 6: Write single holding register,

Function Code 15: Write multiple coils,

Function Code 16: Write multiple holding registers, and

Function Code 56: Retransmit last response.

Figure 6:
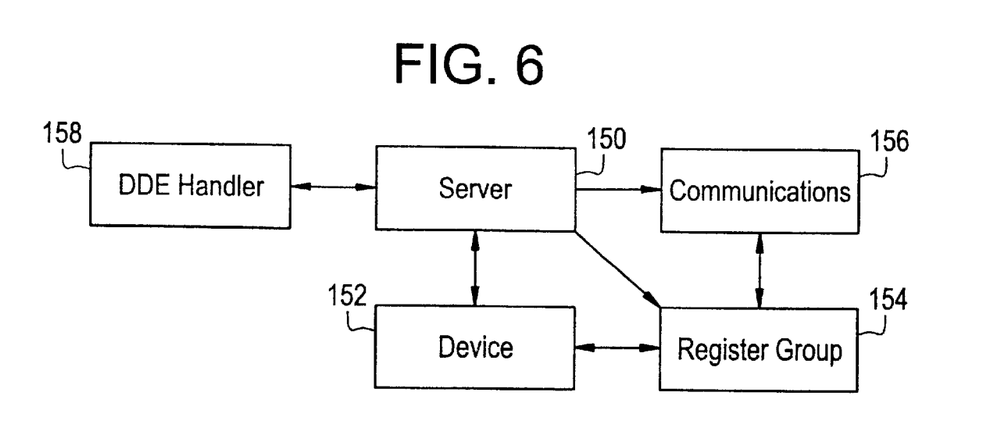
FIG. 6 is a schematic block diagram of the component subsystems of the DDE server, including a server module, a DDE handler module, a device module, a register group module and a communications module.

Referring to FIG. 6, the component subsystems (i.e., modules) of the DDE server include; the server (application) 150, the device module 152; the register groups module 154; the communication module 156; and the DDE handler module 158. All these modules (except for the DDE handler) employ an object oriented approach. Each module comprises several classes.

The application module 150 handles all external inputs to the system viz., user interactions and client requests via the DDE or NetDDE link. As described above the server is configured for various devices when server is off-line. The configuration parameters include register map configuration, mnemonic configuration, and configuration of the communication port to which the device is attached. While on-line, the server will expect requests from clients through the DDE handler and service those requests. It also receives any special command from user, e.g., to stop the protocol, and carries it out properly. In the application module, Class, CServer, provides server communication with the toolkit through the DDE handler and synchronizes comport processing.

Figure 7:
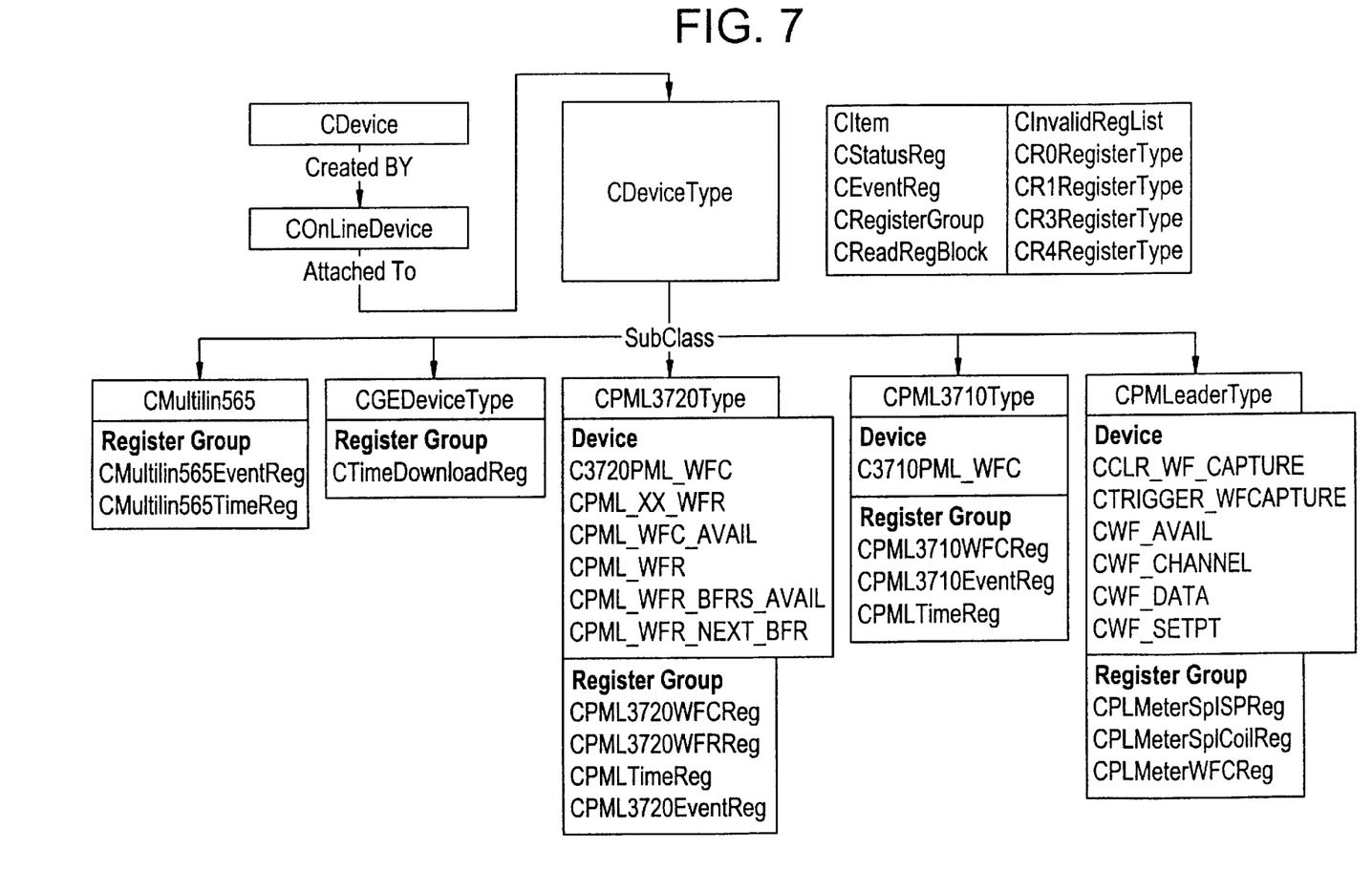
FIGS. 7 and 8 are diagrams of the device module of FIG. 6.
Figure 8:
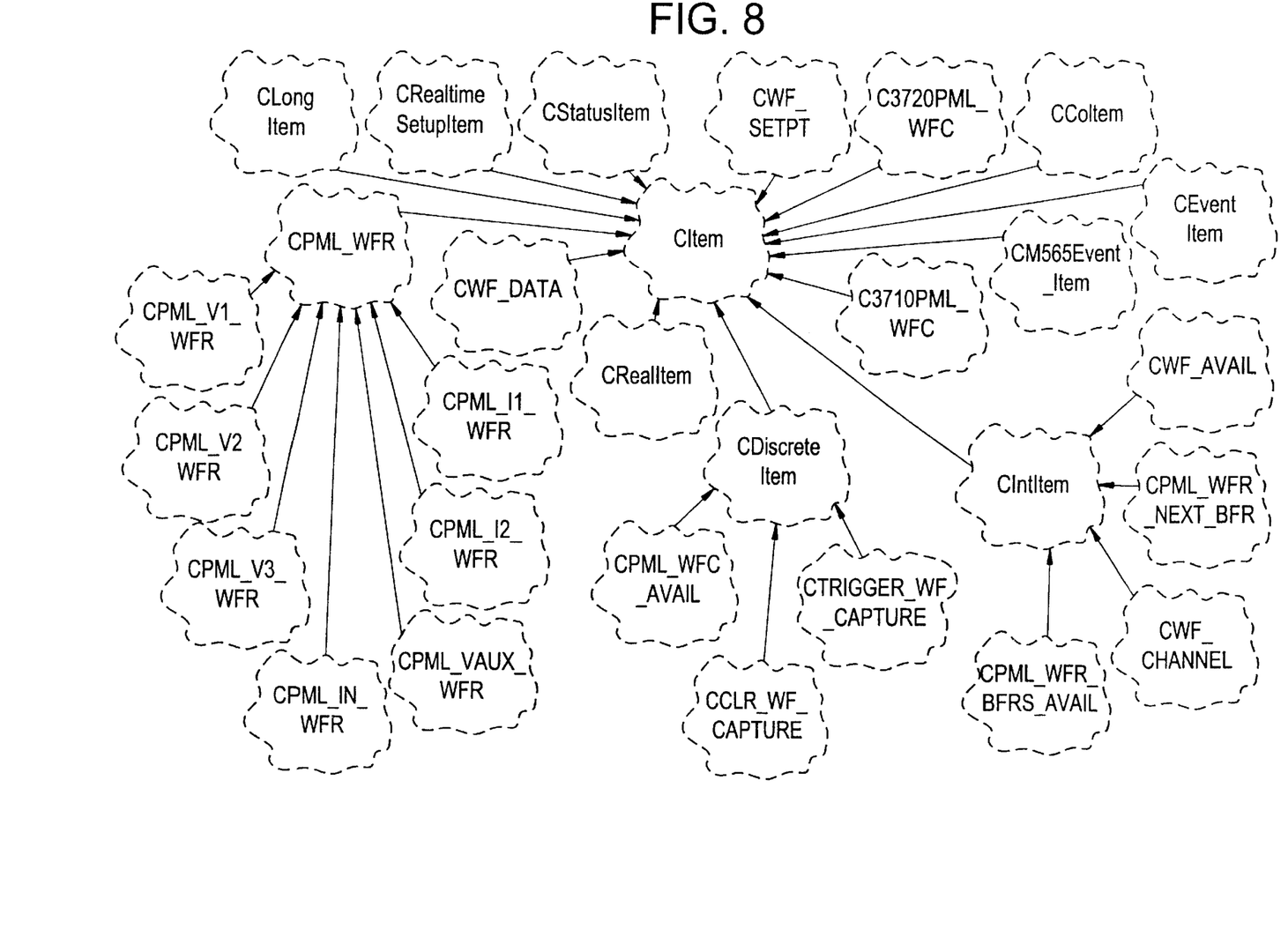

Referring to FIGS. 7 and 8, the device module 152 abstracts a field device and handles multiple register categories (or register groups). Class, CCoilItem, provides support for the special discrete register bit operations for R0 and R1 reference register types. Class, CDev, contains all device information like device name, device ID, device type name and com-port address. Class, CDeviceType, abstracts a field device type the server will talk to, has a variable number of register groups, contains a mnemonics list, and has function codes associated with it. Class, CDiscreteItem, extracts discrete bit array in a register, for a 16-bit register, all 16 bits can be programmed while for a 32-bit register only the lower 16 bits can be specified by user. Class, CEventItem, handles the event processing for a selected device, e.g., a General Electric Co. device, formats an event string and passes it to the client. Class, CGEDeviceType, supports event register group, by way of example, part nos. EPM, RMS6, RMS9B, RMS9C, RMS9D, ECM, PLMeter and MDP qualify as General Electric Co. device types. Class, CIntItem, takes care of unsigned and signed integer items. Class, CItem, is a data point present in field device. CItem comprises a plurality of registers in the device and can handle a single type or array of types. CItem is the base class for different types of items present in the application and include integer, long, real, coil, discrete bits and real time parameters. An item has reference to the register group it belongs to. Whenever a new item is created or activated a dummy register block is created and polled immediately for the fast updating of the item. Class, CLongItem, handles a signed long data type. Class, CMnemonic, contains the mnemonic name and the corresponding register format. Class, CModbusConcType, automatically synchronizes time with all Modbus concentrator device which have only time download property. Class, CMultilin565EventItem, handles the special event processing present for Multilin 565 device. Class, CMultilin565Type, supports event register group and processing for Multilin meters, which are similar to that of General Electric Co. devices. Class, COnLineDevice, exist only when the server is running, whenever an online device is created, a copy of its device type is created and attached to the on-line device. Class, CPLMeterType, is associated with the General Electric Co. Power Leader meter devices and supports CPLMeterWFCReg register group for waveform capture. Class, CPLMeterWFDataItem, is a text item associated with the PLMeter. CPLMeterWFDataItem is a collection of 'n' samples read from the device, with the number of samples and sample's start address are read from the application's .INI file. Class, CPML3710EventItem, handles the event processing for a PML3710 Device and formats an event string and passes it to the client. Class, CPML3710Type, supports a PML3710 Device where the default register group CPML3710WFCRegGroup supports waveform capture. The event processing is similar to other device types except that it doesn't contain an event count register. Class, CPML3710WFCDataItem, is a text item associated with the PML3710. CPML3710WFCDataItem is a collection of 'n' samples read from the device. Each sample is 12 bits and two consecutive registers, giving three values. The number of samples and sample's start address are read from the application's .INI file. Normally for PML devices the WFC is 99 registers. Class, CPML3720AvailItem, handles the PML.sub.- WFC.sub.- AVAIL special item in the PML3720 device. Class, CPML3720EventItem, handles the event processing for a PML3720 Device and formats an event string and passes it to the client. Class, CPML3720Type, supports a PML3720 device. The default register groups that go with this device type are CPML3720WFCRegGroup and CPML3720WFRRegGroup for handling waveform capture and waveform recording respectively. Class, CPML3720WFCDataItem, is a text item associated with the PML3720. CPML3720WFCDataItem is a collection of 'n' samples read from the device, where each sample is 12 bits and two consecutive registers, giving three values. The number of samples and sample's start address are read from the application's .INI file. Class, CPML3720WFRDataItem, collects required sample data and updates them to the client. CPML3720WFRDataItem handles the PML.sub.- WFR.sub.- BFRS.sub.- AVAIL and PML.sub.- WFR.sub.- NEXT.sub.- BFR special items in the PML3720 device. Class, CRealItem, keeps data in an IEEE floating point format, in 16-bit mode, two registers are required while in 32-bit mode, only one register will give the value. Class, CStatusItem, is a text item which exists in every device. The status strings that are updated by this item to a device are ACTIVE and DEAD.

Figure 9:
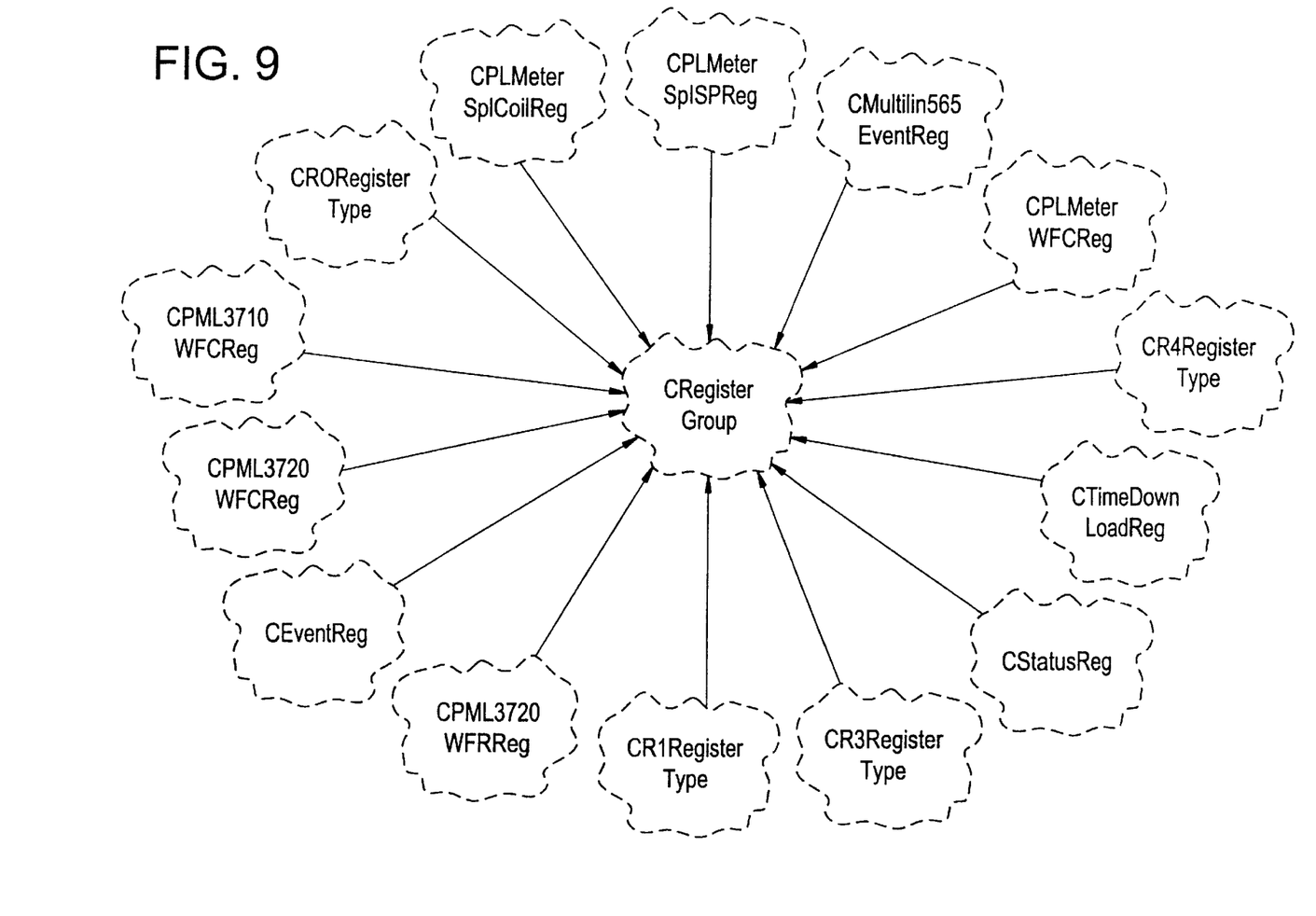
FIG. 9 is a diagram of the register group module of FIG. 6.

Referring to FIG. 9, the register group module 154 supports an array of registers, a few registers in the array may be declared as invalid. Consecutive registers can be grouped together to define an item or a point. An item performs processing on these registers depending on the item type. Clients are interested in the item value after the processing has taken place. The register group module is designed to handle multiple numbers of such items. Class, CEventReg, supports events handling for General Electric Co. devices. Class, CInvalidRegBlock, maintains the invalid range where it contains invalid registers range in (Start, End) pairs. Class, CInvalidRegList, list is an ObList containing CInvalidRegBlock objects for a particular register group. Class, CMultilin565EventReg, supports the Multilin565 events. Class, CPLMeterSplCoilReg, manages two command coil items, i.e., TRIGGER.sub.- WF.sub.- CAPTURE and CLR. sub.- WF.sub.- CAPTURE for General Electric Co. Power Leader Meter. Class, CPLMeterSpISPReg, manages set point registers for the Power Leader Meter. A DDE item present in this group is WF.sub.- SETPT. Class, CPLMeterWFCReg, supports waveform capture for General Electric Co. Power Leader Meter. DDE items present in this group are WF. sub.- DATA, WF.sub.- AVAIL, WF.sub.- CHANNEL, WF.sub.- HOUR, WF.sub.- MIN, WF.sub.- SEC, and WF.sub.- MSEC. This register group supports waveform capture data retrieve. Class, CPML3710EventReg, supports the PML3710 events. Class, PML3710WFCReg, is a register group for PML3710 and has a DDE item referred to as PML.sub.- WFC. This register group supports the PML.sub.- WFC item in retrieving the WFC data from the device. Class, CPML3720EventReg, handles the PML 3720 events. Class, CPML3720WFCReg, is a register group for PML3720 and has only two DDE items which are referred to as PML.sub.- WFC and PML.sub.- WFC.sub.- AVAIL. This register group supports the PML.sub.- WFC item in retrieving the WFC data from the device depending on the availability of the data (which is known by PML. sub.- WFC.sub.- AVAIL). Class, CPML3720WFRReg, is a register group for PML3720 device and has several DDE items which are referred to as PML.sub.- WFR, PML.sub.- WFR.sub.- BFRS.sub.- AVAIL, PML.sub.- WFR.sub.- NEXT.sub.- BFR, PML.sub.- V1.sub.- WFR, PML.sub.- V2.sub.- WFR, PML.sub.- V3.sub.- WFR, PML. sub.- VAUX.sub.- WFR, PML.sub.- 11.sub.- WFR, PML.sub.- 12. sub.- WFR, PML.sub.- 13.sub.- WFR and PML.sub.- IN.sub.- WFR. Class, CR0RegisterType, supports function codes 01 (coil read), 05 (write single coil), 15 (write multiple coils). This is a generic register group type from which the user is allowed to dynamically instant many register groups for a device type. Class, CR1RegisterType, supports function code of 02 (for read discrete bits). All write commands on this type of registers are discarded. This is a generic register group type from which the user is allowed to dynamically instant many register groups for a device type. Class, CR3RegisterType, has a 04 (read input registers) function code. All write commands on this type of registers are discarded. This is a generic register group type from which the user is allowed to dynamically instant many register groups for a device type. Class, CR4RegisterType, is a register group that has specific function codes that are 03 (read holding registers), 06 (write single register), and 16 (write multiple registers). This is a generic register group type from which the user is allowed to dynamically instantiate many register groups for a device type. Class, CReadRegBlock, contains a valid register range which can be used while sending read packet to the device. A valid block may represent one or more than one item. It also contains start and stop positions of items in the register group's item list for register group's convenience while updating the item values to toolkit. The valid blocks are recalculated whenever an item is added or deleted, hence the register blocks list is dynamically changing. Class, CRegister Group, handles a category of registers whose access will be similar by client. It has list of all active items of the group in a member called m-ItemList. Also it has a list of valid register blocks. It can acquire data for all active items in m-ItemList and download data for an item to the device. It maintains a list of valid blocks, which is sent to the field device one at a time. A valid block is polled on behalf of maximum possible items thus optimizing the polling. Class, CStatusReg, manages the STATUS item. This register group and the item are present for all the devices. Class, CTimeDownloadReg, downloads time to the Modbus concentrator and General Electric Co. devices and does not support any items. Class, CTimeDownload565, downloads time to the Multilin565 device and does not support any items. Class, CTimeDownloadPML, downloads time to the PML 3710 and PML 3720 devices, and does not support any items.

Figure 10:
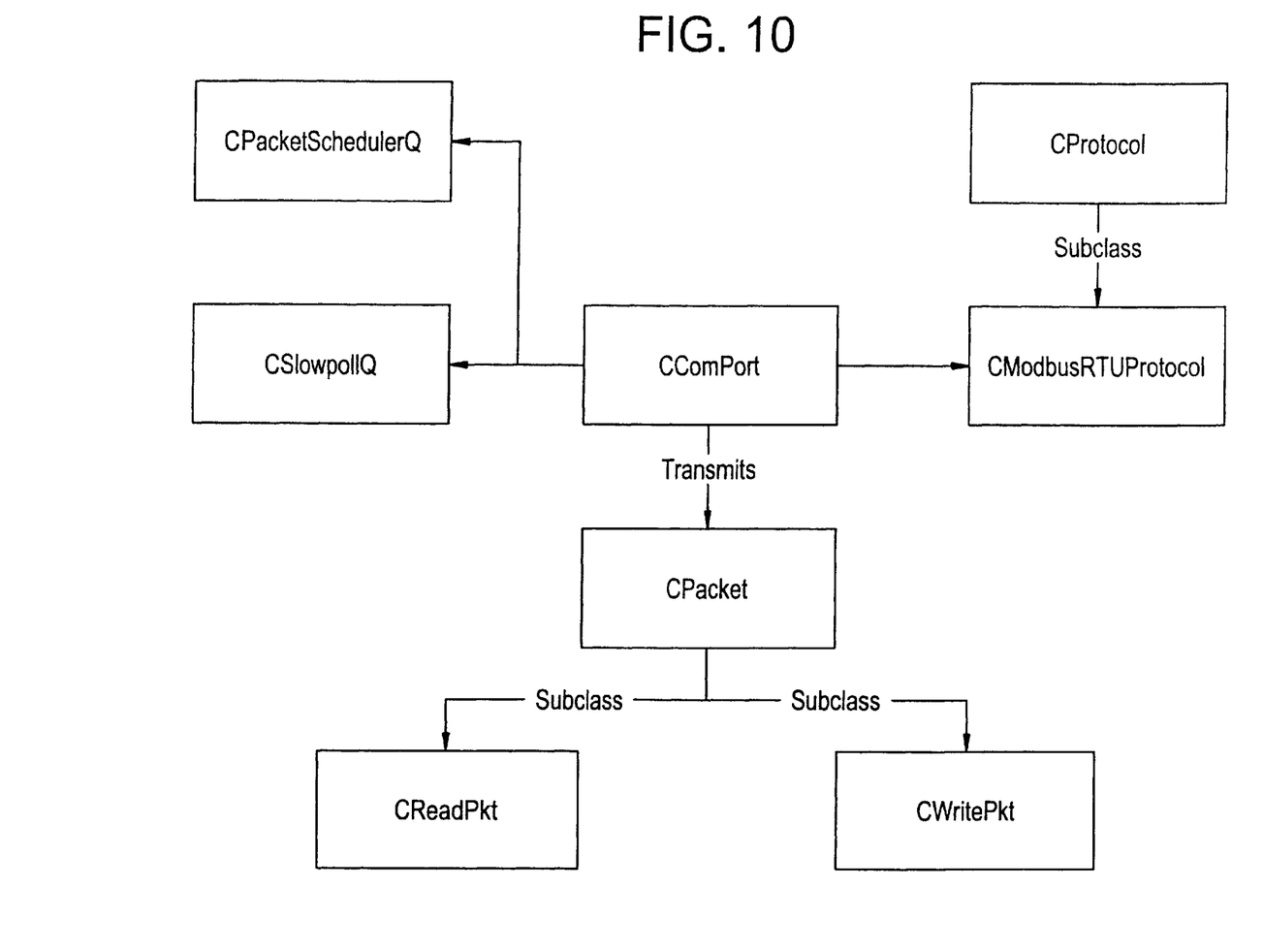
FIGS. 10 and 11 are diagrams of the communication module of FIG. 6.
Figure 11:
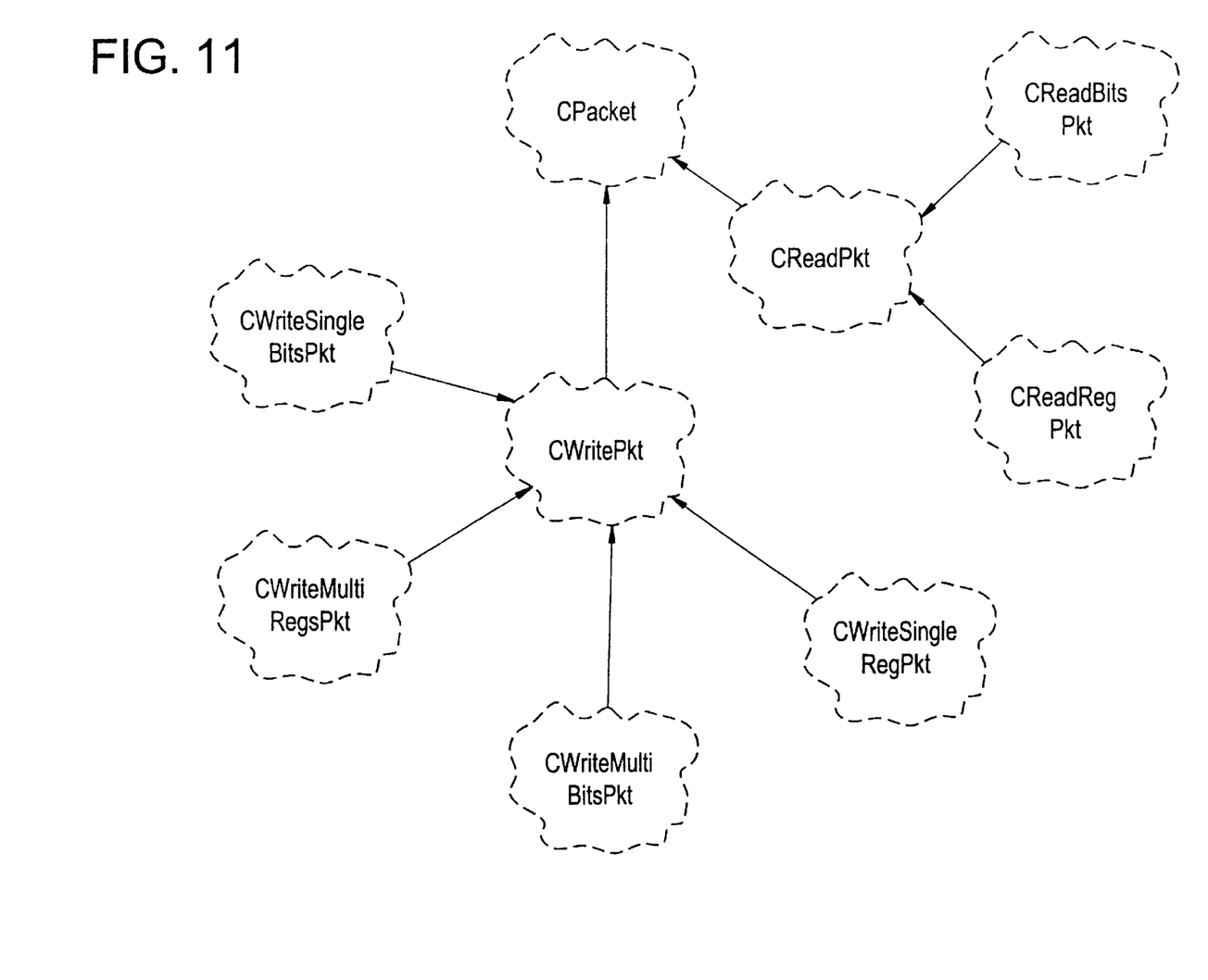

Referring to FIGS. 10 and 11, the communication module 156 enables the server to communicate with a device. All client requests are to be mapped to various Modbus packets and then these packets have to be transmitted to the device successfully. Also the replies from the devices are received here first and checked for CRC error. This module also is capable of declaring any device as DEAD if it cannot communicate with the device or ACTIVE when communication resumes with a previously DEAD device. Class, CComPort, supports the transaction of a Modbus packet between the server application and the device. The com port maintains a queue of packets and returns immediately after transmitting a packet and checks for the response only at the next scan cycle. This improves throughput of packet I/O with the device. Class, CModbusRTUProtocol, implements the specific Modbus RTU protocol functions. This improves class implements Modbus RTU protocol and the method of adding CRC to the data bytes before sending to device. Also, it checks CRC for response bytes and clears it for further processing. Class, CPacket, implements the common understanding between the server and the device with which both are able to talk to each other. The packet does not contain CRC. The CPacket contains both the request as well as the response and acts as a base class for Modbus function code implementation. The packet's interface with items is fixed as two bytes per register in 16-bit mode and four bytes per register in 32-bit mode. For a discrete item or a coil item, the rightmost bit only is used, while all other bits are discarded. Class, CProtocol, is a generalized protocol base class. A protocol is a set of rules governing the format and meaning of the messages (or packets) that are exchanged between the server and the device. CProtocol is designed such that it can put any error-check on bytes before transmitting and also do any error checks on response bytes that are received. Class, CReadBitsPkt, reads discrete registers (R1 reference) and coil register (R0 reference). Class, CReadPkt, is a base packet class that provides generalized methods for all those Modbus packets that are meant for reading register values. Class, CReadRegPkt, reads input registers (R3 reference) and holding registers (R4 reference). Class, CWriteMultiBitsPkt, writes into multiple coil registers (R0 reference). Class, CWriteMultiRegsPkt, writes into multiple holding registers (R4 reference). Class, CWritePkt, is a base packet class which provides generalized methods for all those Modbus packets which are meant for writing single or multiple register values. Class, CWriteSingleBitsPkt, writes into single coil registers (R1 reference). Class, CWriteSingleRegPkt, writes into single holding registers (R4 reference).

The DDE handler module 158 implements the toolkit interface functionality for communicating to clients. It handles various DDE communications with clients and uses HMI package support to interface server class with the HMI toolkit and supports the DDE or NetDDE message protocol. The DDE server utilizes the DDE handler to implement DDE or NetDDE communication links with clients. All client requests are suitably broken down to one or more of the following operations by DDE Handler: CreateTopic, the server becomes ready to poll the device indicated by topic name; CreateItem, an item can be created only for an already created topic and the server becomes ready for polling the item; ActivateItem, the server starts polling the field device corresponding to topic whose item has been activated and supplies the item value to requesting client periodically; DeactivateItem, polling of the active item is stopped; DeleteItem, the specified item is no more required and hence is deleted; and ExecuteCommand, the client performs a command on the device with the specified topic name, whereby if the device is present, and is able to understand the command, the command processing is carried out by server.

In summary, the DDE server uses the Modbus RTU protocol to communicate with a field device. The server has to poll these devices continuously and get the required data for a client. Communication parameters are set up during configuration defining what communication is to be carried out. No initialization before communicating to the devices is necessary. The server always assumes that all the devices are ready and polls them at its poll speed. All fast poll registers are polled continuously, slow poll registers are polled 'n' times slower than fast poll registers where 'n' is read from an INI file, all poll once registers are polled only once when the item becomes active. If some devices do not respond, the server declares them as DEAD and informs interested clients. More specifically, the server transmits a query packet and waits for response, i.e., the server is the master and the device is the slave. If a response from the specified device is received within a fixed time, the server checks the response for CRC error. If CRC available at the end of the response packet matches the CRC computed by server, then the response is accepted and is processed further. If CRC in above case does not match or the response has a CRC error, the server retransmits the packet. A Modbus function code is used, for certain devices that are connected through the concentrator, to request field devices to retransmit the response packet where a CRC error has occurred previously. Otherwise, a query packet is retransmitted by server. The server transmits the query packet to the device until it either gets an accepted response or a specified retransmit limit has been reached. If retransmit limit is reached, the server declares the corresponding device DEAD and stores the query packet in a slow poll queue. The same query packet will be tried again at a slower frequency. If during dead device poll, the server receives a good response packet from the device then server makes that device ACTIVE and will resume normal polling for the device.

The DDE server starts up, reads configuration data from disk and initializes all other objects. The system is started in the on-line mode. The application module is used for configuration of the system. Whenever the user confirms the change (e.g., by pressing OK button, accepting the change), all configuration data is stored into hard disk.

The DDE handler passes all client requests for any topic and any item to the application module. The application module validates that the device exists and passes further request of item data to the device module. The device module is in turn dependent on register groups for getting data in the correct format for any item in any device. The register groups decide which registers are to be polled and with what Modbus function packets. Accordingly, the register groups create a suitable packet and passes it to the communication module. The communication module carries out the actual transaction with the device. The result of the transaction is returned to the register groups, which in turn passes it to the device module. After getting the data, the device module updates it to the clients.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments failings within the scope of the appended claims.

What is claimed is:

1. A power management system comprising:
    a computer;
    an interface at said computer defining a first network having a network layer protocol;
    a gateway connected to said first network, said gateway converting said network layer protocol to a first application layer protocol and defining a second network;
    a first intelligent electronic device connected to said second network;
    a second intelligent electronic device connected to said first network;
    a first server associated with said computer for communicating with said first intelligent electronic device using said first application layer protocol, said first server processing data received from said first intelligent electronic device to manage power use; and
    a second server associated with said computer for communicating with said second intelligent electronic device using a second application layer protocol, said second server processing data received from said second intelligent electronic device to manage power use.

2. The power management system of claim 1 wherein said network layer protocol is a TCP/IP protocol.

3. The power management system of claim 1 wherein said first application layer protocol is a Modbus protocol.

4. The power management system of claim 1 wherein said second application layer protocol is a Manufacturing Message Specification protocol.

5. The power management system of claim 1 further including:
    a concentrator connected to said second network, said concentrator converting said first application layer protocol to a third application layer protocol and defining a third network; and
    a third intelligent electronic device connected to said third network.

6. The power management system of claim 5 wherein said third application layer protocol is a Commnet protocol.

7. The power management system of claim 1 wherein said first network has an Ethernet physical layer protocol.

8. The power management system of claim 1 wherein said second network has an RS-485 physical layer protocol.

9. The power management system of claim 1 wherein said third network has a Commnet physical layer protocol.

10. A power management system comprising:
    a computer;
    an interface at said computer defining a first network having a TCP/IP network layer protocol;
    a gateway connected to said first network, said gateway converting said TCP/IP network layer protocol to a Modbus application layer protocol and defining a second network;
    a first intelligent electronic device connected to said second network;
    a second intelligent electronic device connected to said first network;
    a first server associated with said computer for communicating with said first intelligent electronic device using said Modbus application layer protocol, said first server processing data received from said first intelligent electronic device to manage power use; and
    a second server associated with said computer for communicating with said second intelligent electronic device using a Manufacturing Message Specification application layer protocol, said second server processing data received from said second intelligent electronic device to manage power use.

11. The power management system of claim 1 further including:
    a concentrator connected to said second network, said concentrator converting said Modbus application layer protocol to a Commnet application layer protocol and defining a third network; and
    a third intelligent electronic device connected to said third network.

* * * * *

UNITED STATES PATENT AND TRADEMARK OFFICE
CERTIFICATE OF CORRECTION

PATENT NO. : 6,301,527 B1
DATED : October 9, 2001
INVENTOR(S) : Butland et al.

It is certified that error appears in the above-identified patent and that said Letters Patent is hereby corrected as shown below:

Column 12,
Line 28, after "Class" delete "Creal1tem" and insert therefor -- CRealItem --
Line 31, before "is a text" delete "Cstatus1tem" and insert therefor -- CStatusItem --
Line 43, after "Class" delete "C1nvalidRegBlock," and insert therefor
-- CInvalidRegBlock --
Line 45, after "Class" delete "C1nvalidRegList" and insert therefor -- CInvalidRegList --
Line 46, before "object" delete "C1nvalidRegBlock" and insert therefor
-- CInvalidRegBlock --

Column 14,
Line 53, before "polling" delete "Deactivate1tem" and insert therefor -- DeactivateItem --

Signed and Sealed this

Third Day of May, 2005

JON W. DUDAS
*Director of the United States Patent and Trademark Office*